CENTRALIZED REMOTE CONTROL APPARATUS FOR DICTATION

Filed May 27, 1952 3 Sheets-Sheet 1

INVENTORS
DONALD F. BALMER
BY RICHARD C. BURNS.
H. G. Manning
ATTORNEY

CENTRALIZED REMOTE CONTROL APPARATUS FOR DICTATION

Filed May 27, 1952 3 Sheets-Sheet 2

INVENTORS
DONALD F. BALMER
RICHARD C. BURNS
BY
H. G. Manning
ATTORNEY

March 19, 1957 D. F. BALMER ET AL 2,786,101

CENTRALIZED REMOTE CONTROL APPARATUS FOR DICTATION

Filed May 27, 1952 3 Sheets-Sheet 3

INVENTORS
DONALD F. BALMER
BY RICHARD C. BURNS

H. G. Manning
ATTORNEY

United States Patent Office 2,786,101

Patented Mar. 19, 1957

2,786,101

CENTRALIZED REMOTE CONTROL APPARATUS FOR DICTATION

Donald F. Balmer, Madison, and Richard C. Burns, New Haven, Conn., assignors to The Soundscriber Corporation, New Haven, Conn., a corporation of Connecticut Application May 27, 1952, Serial No. 290,294

9 Claims. (Cl. 179—100)

This invention relates to electronic phonographic dictation systems and more particularly to a centralized apparatus of the above nature which provides for confidential private line recording and playback at a plurality of individual stations.

One object of the present invention is to provide a centralized system of the above nature in which dictation facilities are provided to a number of dictators at a low cost, in which each dictator is provided with a dictating unit and certain accessory equipment at his own desk, and provision is made of a single common recording machine located at a centralized remote point.

A further object is to provide a centralized dictation system of the above nature in which the single recording machine may serve all of the dictation stations selectively, the system being particularly adapted to business offices where the need for dictation is infrequent.

A further object is to provide a dictation apparatus of the above nature employing disk records, and having special adjustments to indicate on said records the precise location of "corrections," "ends of letters," and special insertions or additions.

A further object is to provide a dictation apparatus of the above nature having mechanism at each station to permit the dictator to start and stop the record at his volition, and to play back or "review" his previous dictation through his transducer, whenever desired.

A further object is to provide a dictation apparatus of the above nature having means to notify the individual dictator when dictation is taking place at any other station in the system, or that a record is being changed by the operator at the remote common recorder, indicating in either case that the system is unavailable for his own use.

A further object is to provide a dictation apparatus of the above nature having a depressible transducer cradle at each dictating station, which, when the transducer unit at that station is "hung up," opens the relays of a master station selector box and places the system in readiness for use by any other dictator when he lifts his own transducer unit "off the hook."

A further object is to provide a dictation apparatus of the above nature, in which the lifting of a transducer unit from its cradle or hook at any station will cause that station to transmit electrical impulses by suitable wires through the master selector box to the control chassis which will actuate corresponding relays in the control chassis, and in turn actuate the single remote recorder.

A further object is to provide a dictation apparatus of the above nature, in which the recorder itself has signals which duplicate those at the individual dictating stations, so that the "central" operator may readily "watch" what is going on, whenever the system is in use.

A further object is to provide a dictation apparatus of the above nature, which, when the stylus on the recorder approaches the end of a record, will cause a lamp at the dictating station to blink, and additionally produce an audible "clicking" signal at the same point indicating to the dictator that the record requires changing and that dictation should be temporarily stopped.

A further object is to provide a dictation apparatus of the above nature, in which the dictator is relieved of the necessity of pushing the "end-of-letter" button when he is through dictating, by the provision of means actuated by the hanging up of his transducer unit for closing a timing relay associated with a suitable resistor and capacitor on the control chassis to automatically produce an "end-of-letter" indication on the record.

A further object is to provide a dictation apparatus of the above nature, in which the action of taking any particular transducer unit off the hook at any dictating station actuates a special relay for that station, and opens the power-supply circuits to the other stations, which are thus deactivated.

A further object is to provide a dictation apparatus of the above nature in which a system of intervening relays is employed to avoid transmitting any high voltage to the outside of the apparatus, and in which the only outside potential comes from a low voltage power transformer and dry rectifiers, which potential is of the order of 30 volts, a safe value for transmitting through telephone wires within a building.

A further object is to provide a device of the above nature which will be relatively simple in construction, inexpensive to manufacture, easy to install and manipulate, compact, ornamental in appearance, and very efficient and durable in use.

With these and other objects in view, there has been illustrated on the accompanying drawings, one form in which the invention may conveniently be embodied in practice.

In the drawings.

Referring now to the drawings in which like reference numerals denote corresponding parts throughout the several views, the construction of the present invention will be described in connection with the following description of the operation thereof.

Figure 2:
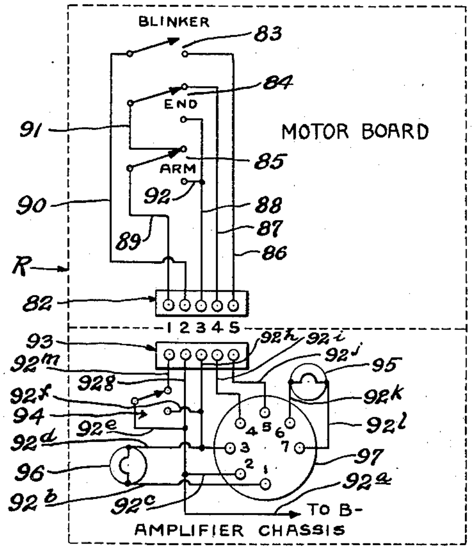
Fig. 2 is a diagrammatic view of the recorder circuits used in the system, and showing the motor board and the amplifier chassis upon which it is mounted.

Each casing 28a is equipped with a dynamic hand transducer unit M and a depressible cradle 29, which, when said transducer unit M is lifted from it, actuates an operating button 30 which causes a movable switch arm 31 to engage a stationary contact 32.

Figures 5, 6:
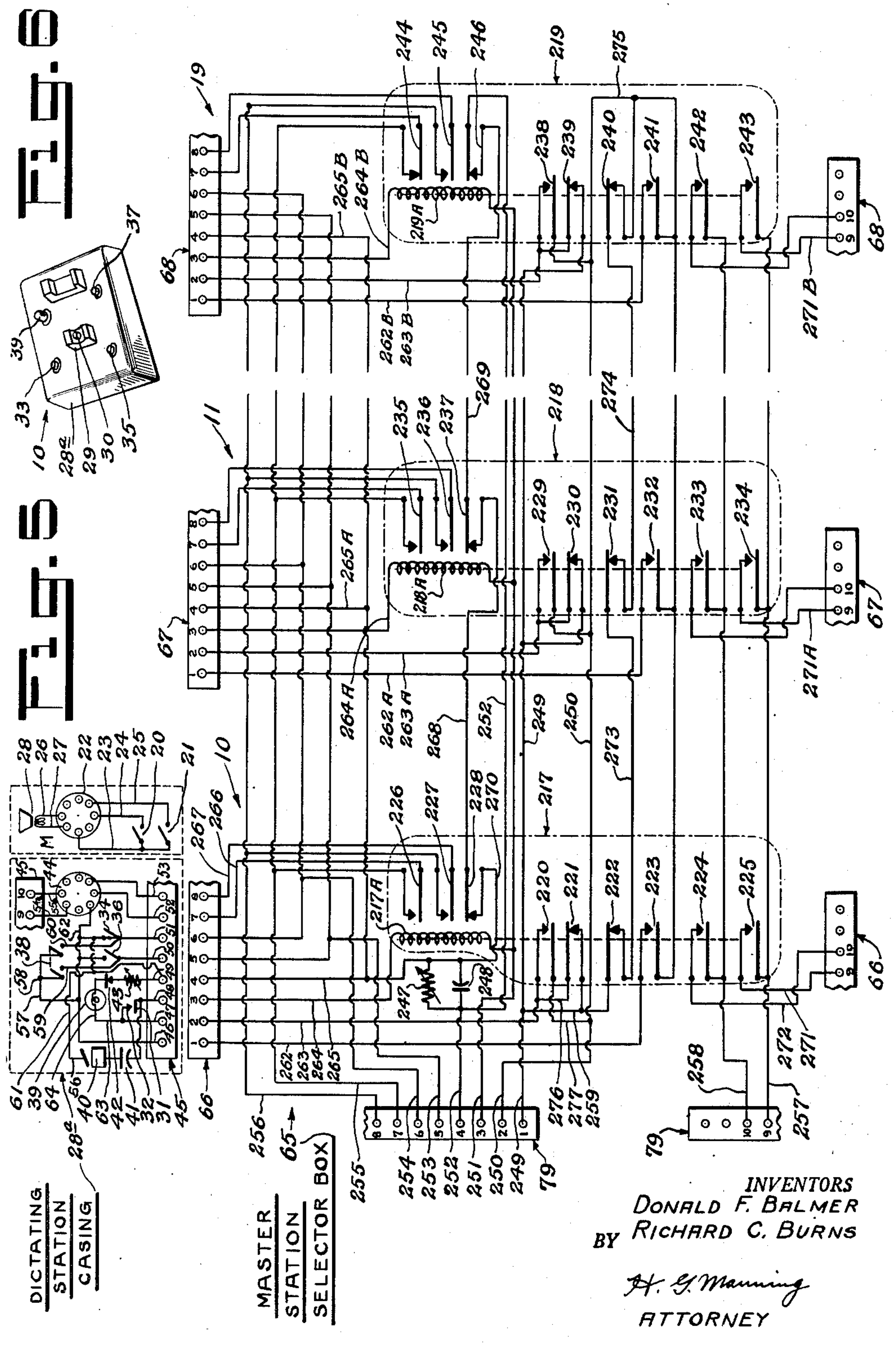
Fig. 5 is a detail diagrammatic view of the master station selector box and circuits for three of the individual dictating stations connected therewith.
Fig. 6 is a perspective view of a control casing employed at each of the individual dictating stations.

Each transducer unit M includes a transducer 28 (Fig. 5) connected by wires 26, 27 to a seven-prong transducer plug 22. The seven-prong plug 22 is connected to a motor-start switch 21 by wires 23, 25, and a quick review switch 20 is connected to the seven-prong plug 22 by wires 23, 24.

The plug 22 fits into a seven-prong socket 44 located inside the casing 28a of each dictating station 10 to 19.

Provision is also made of an indicating lamp 39 at each station which shows when the equipment is in readiness to accept dictation. The lamp 39 is in series with a selenium rectifier 42 and an adjustable resistor 43. The function of the rectifier 42 is to prevent interaction between circuits, and the function of the resistor 43 is to maintain the current through the lamp 39 at its proper value.

The parts just described are connected to a ten-prong terminal strip 45 on the casing 28*a* by the wires 46 to 55 inclusive (Fig. 5), a junction 58, and wires 59 to 64 inclusive, to the master station selector relay box 65, to which are connected ten wire cables 69 to 78 (Fig. 1), leading to the dictating stations 10 to 19. The cables 69 to 78 are also connected to ten terminal strips, only three (66, 67, 68) of which are herein illustrated.

The function of the master station selector box 65 is to provide a connection from the transducer 28 and switch circuits at the individual dictation stations 10 to 19, to the control chassis 81, in such a way that when any hand transducer unit M is taken off of its cradle 29 (thus connecting its transducer 28 and its associated control circuit to the control chassis 81), it will be impossible for any other transducer 28 or its control circuit to be connected to said control chassis 81. The removal of the transducer unit M from its cradle 29 at any station causes the movable switch arm 31 (Fig. 5) to engage the stationary contact 32—closing whichever of the relays 217, 218, 219, corresponds to the particular dictating station 10 to 19 from which the transducer M has been removed.

One end of each of the station relay coils 217*a*, 218*a*, 219*a*, is connected to the positive side of the power supply by a common conductor 251. The other end of each relay coil 217*a*, 218*a*, 219*a*, is connected to the stations 10 to 19 by conductors 264, 264*a*, 264*b*, respectively.

It will be understood that the closing of the switch 31, 32, carries current to the station relay coils 217*a*, 218*a*, 219*a*, respectively, through a conductor 263, contact 221, contact 222, conductor 273, contact 231, conductor 274, contact 240, conductor 275, conductor 250, to the negative side of the power supply—i. e. terminal #2 on strip 79.

The relay 217 at station #10 is so arranged that the contact 220 closes before the contacts 221, 222 open, and thus, even after said contacts open, current will continue to flow through the coil 217*a*. However, when the contact 222 opens, it is impossible for the power to energize any of the other relay coils 218, 219, thus assuring that if anyone else should pick up his transducer unit M off of the cradle 29, nothing will happen, and that the recording in progress will not be interfered within any way.

The other relays 218, 219 similarly have contacts 229 and 238 which make before the other contacts break. This arrangement permits continuous flow of current to the relay coils during the switching operation.

When the transducer unit M rests on its cradle 29 at all dictating stations, 10 to 19, the lamps 39 on the casings at all stations will be lighted by means of the following path (Fig. 5): from the lamp 39 to the positive side of the power supply through conductor 252, contact 246, conductor 269, contact 237, conductor 268, contact 228, conductor 270, conductor 265, conductor 49, adjustable resistor 43 and rectifier 42.

The conductor 252 and the contact #4 of the terminal strip 79 connect through to the positive side of the power supply within the control chassis.

The lamp 39 is connected to the negative side of the power supply by means of the conductors 64, 63, 47, 263, 276, contact 221, conductor 259, contact 222, conductor 273, contact 231, conductor 274, contact 240, conductors 275, 250, and terminal #2 of the ten-conductor strip 79.

When the transducer unit M at any station 10 to 19 is removed from its cradle 29, the movable arm 31 engages the stationary contact 32, actuating the relay 217. The lamp 39 is now lit by means of the following path: conductor 252, adjustable resistor 247, conductors 265, 49, adjustable resistor 43, and rectifier 42, connecting the lamp to the positive side of the power supply terminal #4 of the strip 79.

The lamp 39 is connected to the negative side of the power supply through the conductors 64, 63, 263, relay contact 220 (which is now closed) conductors 277, 250 to terminal #2 of the strip 79. This operation causes the contact 222 to remain open. Thus, there is no longer a completed circuit from any of the other lamps 39 to the negative side of the power supply, and consequently, all of the lamps 39 except that at the station from which the transducer unit M has been picked up, will be "out."

The apparatus also includes a circuit connection from the relay 217 via contact 223, which connects the motor-start circuit and the quick-review circuit to the negative side of the power supply. Moreover, the contacts 224, 225 connect the transducer 28 to the input transformer (not shown) of the recorder R. The opening and closing of the contact 226 controls the other side of the quick-review circuit, and the movable contact 227 controls the motor-start circuit.

The opening of contact 228, which, being in series with the closed contacts 237, 246, normally shorts out the resistor 247 when relays 217, 219 are closed, and allows the current through the lamp 39 to flow through the adjustable resistor 247, which compensates for the variations in power supply voltage.

The depression of the button 33 on the casing 28*a* of any one of the dictating stations 10 to 19 operates a switch 34 which momentarily closes the correction relay 126 (Fig. 4), which in turn introduces a one-microfarad capacitor 129 into the grid circuit of a time-delay vacuum tube 135. The capacitor 129 has previously been charged from the plate voltage circuit of the tube 135, the charging rate of which is limited by the resistor 142.

The application of said charge to the control grid 138 of the tube 135 causes the plate current to increase and close the motor-start relay 143, which remains closed until the charge of the capacitor 129 leaks off through the fixed resistor 133 and the adjustable resistor 134 which are in the grid circuit of the tube 135.

Figure 3:
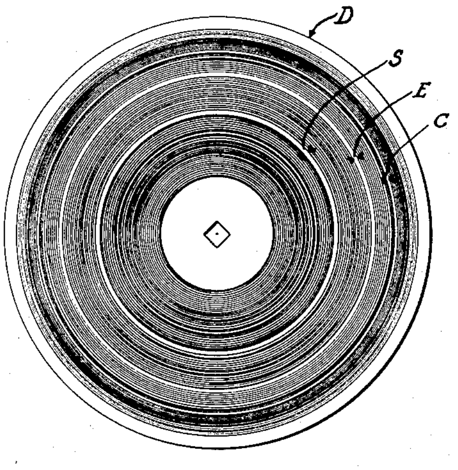
Fig. 3 is a plan view of a disk record used in the system, showing the index spaces of varying widths to indicate the location of a correction, the end of a letter, and special dictated material.

The indexing motor 110 will thus operate and overdrive the feed mechanism, producing a correction indicating space C on the record disk D (Fig. 3).

When the "end-of-letter" button 35 is depressed, at any of the dictating stations 10 to 19, the relay 127 will be momentarily closed by a switch 36 and will introduce a two-microfarad capacitor 130 into the grid circuit of the time delay tube 135, permitting the motor 110 to advance the feed mechanism sufficiently to produce an "end-of-letter" indicating space E, twice the width of the correction-indicating space C.

The capacitor 130 has previously been charged from the plate voltage circuit of the tube 135 through the resistor 142 which limits the charging rate so that the application of its charge to the grid 138 of the tube 135 increases the plate current and closes the motor-start relay 143. This relay 143 stays closed until the charge of the two-microfarad capacitor 130 leaks off through the fixed resistor 133 and the adjustable resistor 134 in the grid circuit of the tube 135.

A "special information" button 37 is also provided at each station 10 to 19, which when depressed, operates both relays 126, 127, causing both capacitors 129, 130 to discharge, thereby producing an index space S on the disk D equal to the sum of the spaces C and E.

The feed mechanism and quick-review system employed are similar to those described in a co-pending application, S. N. 90,176, filed April 28, 1949, by A. C. De Napoli, Jr., entitled "Dictating Machine With Combined Hand Microphone and Control Means," Patent No. 2,611,037, dated September 16, 1952.

In operating the motor-start system, the depression of a button (not shown), on the hand transducer unit M, closes the motor-start switch 21 (Fig. 5), which in turn closes the contacts of the motor-start relay 124 (Fig. 4), which operates a similar relay (not shown) in the recorder R. Moreover, closing of the quick-review switch 20 (Fig. 5), actuates a quick-review relay 125 (Fig. 4), the contacts of which operate a similar relay (not shown) in the recorder R.

When the end of the record D nears, a blinker switch 83 within the recorder (Fig. 2) automatically closes, causing alternate charging and discharging of the capacitor 131 (Fig. 4), which is in circuit with a timing resistor 132, and causes the blinker relay 128 to make and break successively, thus transmitting pulses of current to the lamps 39 at all dictating stations 10 to 19, as well as to the red lamp 95 at the recorder R. The blinking of the lamps 39, 95 indicates that the record D requires changing.

The blinker circuit through lamp 39 may be traced as follows: from lamp 39 to rectifier 42, to adjustable resistor 43, to conductors 49, 265, to resistor 247, to conductor 252, to conductor 190, to contact 278 of relay 143, to conductor 279, to contact 280 of relay 128, to conductor 161, to contact #4 on plug 98, to contact #4 of socket 97, to conductor 92*i*, to contact #4 of socket 93, to contact #4 of plug 82, to conductor 87, to switch 84, to conductor 91, to switch 85, to conductor 89, to contact #1 of plug 82, to contact #1 of socket 93, to conductor 92*m*, to talk-listen switch 94, to conductor 92*e*, to conductor 92*g*, to conductor 92*a* leading to B—.

The blinker circuit through lamp 95 may be traced as follows: from lamp 95 to conductor 92–1, to contact 7 of socket 97, to contact 7 of plug 98, to conductor 102, to contact #12 of terminal strip 104, to conductor 168, to rectifier 108, to conductor 169, to adjustable resistor 107, to conductor 170, to junction 191, to contact 278 of relay 143, to conductor 279, to contact 280 of relay 128, to conductor 161, to contact #4 on plug 98, to contact #4 of socket 97, to conductor 92*i*, to contact #4 of socket 93, to contact #4 of plug 82, to conductor 87, to switch 84, to conductor 91, to switch 85, to conductor 89, to contact #1 of plug 82, to contact #1 of socket 93, to conductor 92*m*, to talk-listen switch 94, to conductor 92*e*, to conductor 92*g*, and to conductor 92*a* leading to B—.

Additionally, an audible clicker 40 is actuated by the charging current through the capacitor 41 (Fig. 5), whenever the lamp 39 is lighted.

In order that the dictator will be relieved of the necessity of pushing the "end-of-letter" button 35, whenever he is through dictating, the placing of the transducer unit M upon the cradle 29 depresses the operating button 30, which in turn causes the relay 217 (station 10) to open, and applies a voltage to terminal #1 of the ten-terminal strip 79, and through the ten-conductor cable 80, energizes terminal #1 of the ten-terminal strip 105. Since the capacitor 149 (Fig. 4) is connected to the terminal #1 on the strip 105, it will charge through the relay 150, closing the "end-of-letter" relay 127, which, as previously described, will cause an indicating space E to be produced on the disk D (Fig. 3).

The apparatus also includes a resistor 148 which slowly discharges the capacitor 149 whenever a transducer unit M is lifted from its cradle 29.

The master station selector box 65 is connected to the control chassis 81 by a ten-conductor cable 80 (Fig. 1) which is also connected to the ten-terminal strip 79 on the master station selector box 65 and a ten-terminal strip 105, 106 on the control chassis 81.

Figure 4:
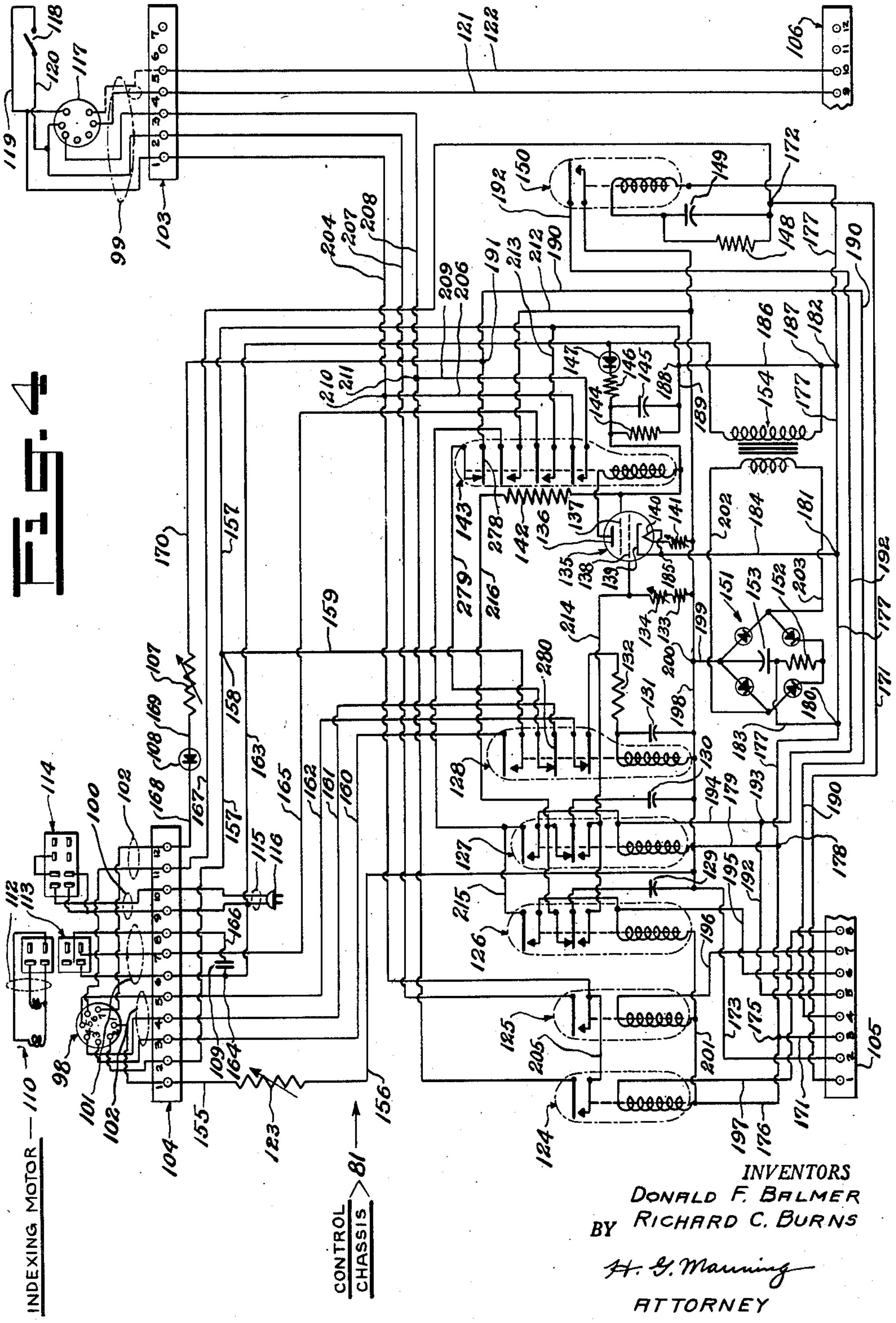
Fig. 4 is a detail electrical diagram showing the circuits of the power supply and control chassis.

The control chassis 81 includes the associated relays 124, 125, 126, 127, 128, 143, 150 (Fig. 4).

Figure 1:
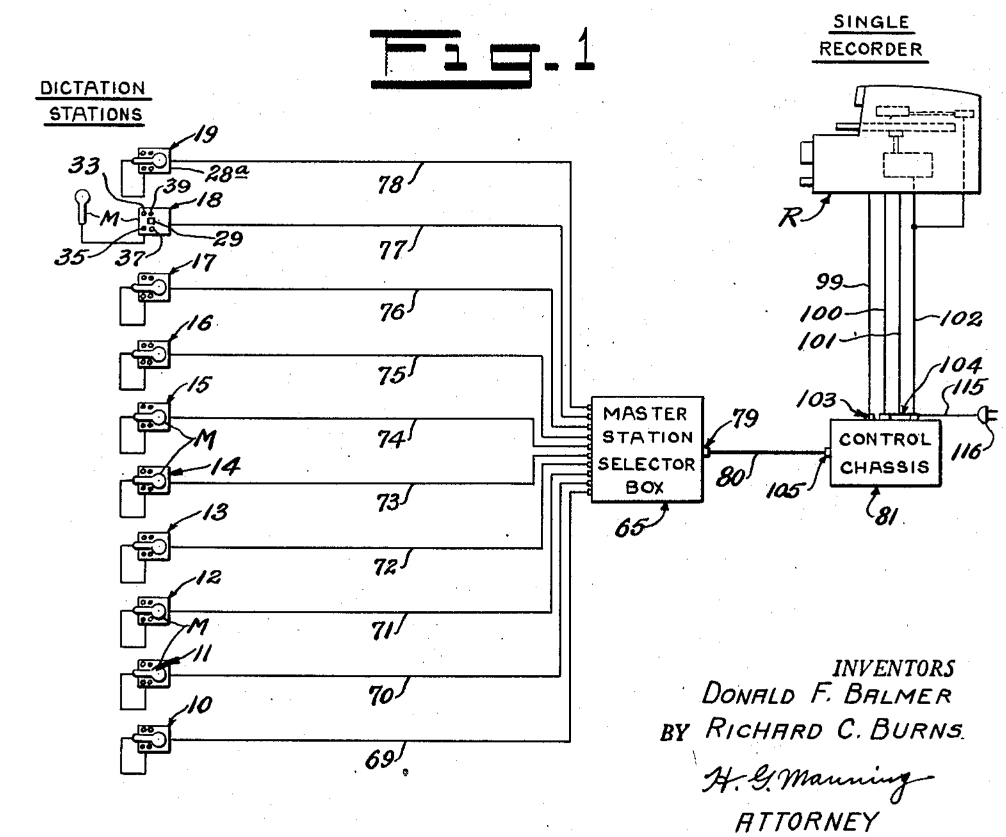
Fig. 1 is a schematic block diagram of the entire centralized system showing ten individual dictating stations, a master station selector box, a control chassis, and a single recorder.

Power is supplied to the apparatus by means of the cable 115, and the two-prong plug 115 (Fig. 1). This cable 115 is connected with the terminal strip 104.

A cable 101 (Figs. 1 and 4) carries power from a socket 113 to the indexing motor 110 through the plug 111 and cable 112. The cable 101 is connected to the terminal strip 104 on the control chassis 81.

The recorder R is equipped with suitable switches and relays and derives its power through the cable 100 (Figs. 1, 2, 4), and an eight-prong socket 114 which is connected to the terminal strip 104 of the control chassis 81.

Connection is made from the motor board switches 83, 84, 85 and the red and green lamps 95, 96, respectively (Fig. 2), by means of the seven-prong plug 98 and a cable 102 (Figs. 1, 4) which is connected to the terminal strip 104 of the control chassis 81.

The transducer circuit is carried through the control chassis 81 by wires 121, 122 (Fig. 4) from the terminal strip 103 to the terminal strip 106. The "motor-start" and "quick-review" circuits are carried through the recorder R by the conductors 204, 207, 208 of the control chassis 81, to the terminal strip 103.

A cable 99 (Figs. 1, 4) connects the transducer 28 to the motor-start and quick-review circuits of the recorder R through the seven-prong plug 117. The push button 118 operates a switch which is connected to the transducer socket (not shown) on the base of the recorder R by the conductors 119, 120. This switch is of the single-pole, normally-open, push button type and is mounted on the front of the recorder R. It permits the operator of the recorder to start and stop the turntable whenever desired.

The blinker switch 83, the end-of-disk indicating switch 84, and the lamp-extinguishing switch 85 (Fig. 2) are connected to a five-terminal plug 82 by the conductors 86 to 92 inclusive (Fig. 2). The five-terminal plug 82 is detachably connected to a five-terminal socket 93.

The position of the automatic switch 94 indicates whether the machine is in recording or non-recording position.

The red and green indicating lamps 95, 96 are connected to the seven-aperture socket 97, which is engageable with the seven-prong plug 98, and is also connected by conductors 92*a* to 92*m* respectively, to the five-terminal socket 93.

An adjustable resistor 107 and a rectifier 108 (Fig. 4) are in series with the red lamp 95 and the wires 168, 170. The resistor 107 serves to adjust the current passing through the lamp 95 to the proper value and prevents undesirable interaction between circuits. The adjustable resistor 123 (Fig. 4) in series with wires 155, 156, maintains the current through the green lamp 96 at the proper value.

A capacitor 109 (Fig. 4) is provided in the starting winding of the motor 110, and a transformer 154 supplies low voltage A. C. to a bridge rectifier power supply 151. A resistor 152 limits the surge through the rectifier 151 when the current is first turned on, and a capacitor 153 acts to filter out the A. C. components. A selenium rectifier 147 with a surge-limiting resistor 146, a smoothing capacitor 145, and a load resistor 144 provide the proper D. C. voltage directly to the screen grid 137 of the tube 135 and through the motor-start relay 143 to the plate 136 of said tube. The tube cathode 139 is connected to the negative side of the power supply.

The heater 140 of the tube 135 has in series with it an adjustable resistor 141 which maintains the heater current at the proper value.

Various other wires, contacts, and junctions, indicated on the drawing, provide the proper interconnection between all the parts, the functions of which have already been described.

While there has been disclosed in the specification one form in which the invention may be embodied, it is to be understood that this form is shown for the purpose of illustration only and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a remote control dictation system employing a single recording station including a record having closely spaced grooves, and a plurality of dictating stations, the combination comprising a plurality of casings, one at each of said dictating stations, each casing being provided with a depressible cradle and a removable hand transducer unit resting thereon, means responsive to the lifting of said transducer unit from its respective cradle for activating said station for dictation, a control circuit connected between said dictating stations and said recording station, said recording station comprising an indexing motor operable when energized to widen the recording groove spacing, and switch means at each of said stations operative when its respective station is in activated condition to temporarily energize said indexing motor to produce an index space between grooves of said record.

2. In a remote control dictation system employing a single recording station including a record having closely spaced grooves, and a plurality of dictating stations, the combination comprising a plurality of casings, one at each of said dictating stations, each casing being provided with a depressible cradle and a removable hand transducer unit resting thereon, means responsive to the lifting of said transducer unit from its respective cradle for activating said station for dictation, a control circuit connected between said dictating stations and said recording station, said recording station comprising an indexing motor operable when energized to widen the recording groove spacing, and means operative upon the replacement of the transducer of an activated dictating station in its cradle to temporarily energize said indexing motor to produce a widened index space on the record signifying the end of a dictated letter.

3. The invention as defined in claim 1, having a current source circuit for said indexing motor, a normally open switch in said source circuit, a relay for controlling said normally open switch, vacuum tube control means in circuit with said relay for energizing said relay to close said normally open switch, said vacuum tube having a control grid, and means operative upon activation of said switch means to temporarily change the bias voltage on said control grid.

4. In a remote control dictation system employing a single recording station including a record having closely spaced grooves, and a plurality of dictating stations, the combination comprising a plurality of casings, one at each of the dictating stations, each casing being provided with a depressible cradle and a removable hand transducer unit resting thereon, means responsive to the lifting of said transducer unit from its respective cradle for activating said station for dictation, a control circuit connected between said dictating stations and said recording station, said recording station comprising an indexing motor operable when energized to widen the recording groove spacing, and a plurality of switch means at each of said stations selectively operable when their respective station is in activated condition to temporarily energize said indexing motor to produce widened indexing spaces of different widths on the record.

5. The invention as defined in claim 4, wherein said plurality of switch means comprises a current source circuit for said indexing motor, a normally open switch in said source circuit, a relay for controlling said normally open switch, vacuum tube control means in circuit with said relay for energizing said relay to close said normally open switch, said vacuum tube having a control grid, and means operative upon selective actuation of said switch means to temporarily change the bias voltage on said control grid for discrete lengths of time depending upon which one of said plurality of switch means is actuated.

6. The invention as defined in claim 5, wherein said bias change means comprises a plurality of condenser-resistor time-delay circuits.

7. The invention as defined in claim 5, wherein said bias change means comprises a first charged condenser, a second charged condenser, and a grid leak resistor connected to the control grid of said vacuum tube, said plurality of switch means being operative to connect one or the other of said condensers or both together, selectively, for discharge through said grid resistor.

8. The invention as defined in claim 5, wherein said bias change means comprises a first charged condenser, a second charged condenser of greater capacity than said first condenser, a grid leak resistor connected to the control grid of said vacuum tube, and switching relay means, one for each condenser to connect one or the other of said condensers or both together, selectively, for discharge through said grid leak resistor, said plurality of switch means being operative to actuate said switching relay means.

9. The invention as defined in claim 1, in which provision is made of signal means at each station to indicate that the equipment at any station is in use or that a record is being changed.

References Cited in the file of this patent

UNITED STATES PATENTS

| | | |
|---|---|---|
| 2,066,672 | Berard et al. | Jan. 5, 1937 |
| 2,200,351 | Whitehead | May 14, 1940 |
| 2,277,207 | Clenoweth et al. | Mar. 24, 1942 |
| 2,277,208 | Clenoweth et al. | Mar. 24, 1942 |
| 2,305,681 | Dunning | Dec. 22, 1942 |
| 2,348,204 | Brubaker | May 9, 1944 |